United States Patent
Cai

(10) Patent No.: US 12,375,406 B2
(45) Date of Patent: Jul. 29, 2025

(54) VIRTUAL SOCKET FOR LOAD BALANCING AND FAILOVER

(71) Applicant: Hewlett Packard Enterprise Development LP, Houston, TX (US)

(72) Inventor: Linghan Cai, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/877,597

(22) Filed: Jul. 29, 2022

(65) Prior Publication Data

US 2024/0039850 A1 Feb. 1, 2024

(51) Int. Cl.
*H04L 47/125* (2022.01)
*H04L 47/122* (2022.01)
*H04L 47/30* (2022.01)

(52) U.S. Cl.
CPC .......... *H04L 47/125* (2013.01); *H04L 47/122* (2013.01); *H04L 47/30* (2013.01)

(58) Field of Classification Search
CPC ..... H04L 47/125; H04L 47/122; H04L 47/30; H04L 47/124; H04L 45/24; H04L 45/245; H04L 67/1004; H04L 69/14; H04L 69/163; H04L 47/193; H04L 45/28; H04W 80/06; G06F 11/0712; G06F 11/0793

See application file for complete search history.

(56) References Cited

U.S. PATENT DOCUMENTS

| | | | |
|---|---|---|---|
| 5,764,756 A | 6/1998 | Onweller | |
| 5,799,016 A | 8/1998 | Onweller | |
| 5,999,965 A | 12/1999 | Kelly | |
| 7,373,500 B2 | 5/2008 | Ramelson et al. | |
| 8,018,961 B2 | 9/2011 | Gopinath et al. | |
| 8,675,674 B2 | 3/2014 | Saha et al. | |
| 9,590,914 B2 | 3/2017 | Alizadeh Attar et al. | |
| 10,547,559 B2 | 1/2020 | Vasudevan et al. | |
| 10,649,790 B1 * | 5/2020 | Ingegneri | G06F 9/4405 |

(Continued)

FOREIGN PATENT DOCUMENTS

JP 2003110604 A * 4/2003

OTHER PUBLICATIONS

Kumar, "Data sequence signal manipulation in multipath TCP (MPTCP): The vulnerability, attack and its detection", (Year: 2021).*

(Continued)

*Primary Examiner* — Messeret F Gebre

(74) *Attorney, Agent, or Firm* — Yao Legal Services, Inc.

(57) ABSTRACT

One aspect of the instant application can provide a system and method for balancing load among multiple network sockets established between a local node and a remote node. During operation, the system can encapsulate the multiple network sockets to form a local transport-layer virtual socket comprising a write interface and a read interface. The system can receive, at the write interface of the local transport-layer virtual socket, a packet; select, based on a load-balancing policy, a network socket from the multiple network sockets; and forward the packet to a socket-specific incoming queue associated with the selected network socket to allow the packet to be sent to the read interface of a corresponding remote transport-layer virtual socket via the selected network socket.

22 Claims, 8 Drawing Sheets

(56) References Cited

U.S. PATENT DOCUMENTS

| | | | |
|---|---|---|---|
| 2006/0075127 A1* | 4/2006 | Juncker | H04L 63/029 709/229 |
| 2008/0114882 A1* | 5/2008 | Christenson | H04L 69/162 709/228 |
| 2014/0006632 A1 | 1/2014 | Evens | |
| 2017/0325113 A1 | 11/2017 | Markopoulou et al. | |
| 2018/0041613 A1* | 2/2018 | Lapidous | H04L 67/564 |
| 2019/0044847 A1* | 2/2019 | Guillemin | H04L 47/6295 |
| 2021/0029179 A1* | 1/2021 | Ravich | H04L 67/52 |

OTHER PUBLICATIONS

Chand "An Adaptive and Efficient Packet Scheduler for Multipath TCP" (Year: 2019).*

Paasch, "Improving Multipath TCP", 2014 (Year: 2014).*

S. Braun, C.-T. Cheng, S. Dowey and J. Wollert, "Survey on Security Concepts to Adapt Flexible Manufacturing and Operations Management based upon Multi-Agent Systems," 2020 IEEE 29th International Symposium on Industrial Electronics (ISIE), Delft, Netherlands, 2020, pp. 480-484 (Year: 2020).*

V. Melnyk, O. Kuzmych, N. Bahniuk, N. Cherniashchuk, L. Hlynchuk and O. Mekush, "Effective Big Data Analysis Based on Sockets. Application to Biomedical Data Processing," 2021 11th International Conference on Advanced Computer Information Technologies (ACIT), Deggendorf, Germany, 2021, pp. 666-671 (Year: 2021).*

H. Si, C. Sun, B. Chen, L. Shi and H. Qiao, "Analysis of Socket Communication Technology Based on Machine Learning Algorithms Under TCP/IP Protocol in Network Virtual Laboratory System," in IEEE Access, vol. 7, pp. 80453-80464, 2019 (Year: 2019).*

O. Serres, A. Anbar, S. G. Merchant, A. Kayi and T. El-Ghazawi, "Address Translation Optimization for Unified Parallel C Multidimensional Arrays," 2011 IEEE International Symposium on Parallel and Distributed Processing Workshops and Phd Forum, Anchorage, AK, USA, 2011, pp. 1191-1198 (Year: 2011).*

C. Georgiou, P. M. Musial, A. A. Shvartsman and E. L. Sonderegger, "An Abstract Channel Specification and an Algorithm Implementing It Using Java Sockets," 2008 Seventh IEEE International Symposium on Network Computing and Applications, Cambridge, MA, USA, 2008, pp. 211-219 (Year: 2008).*

Juniper Networks, Inc., "SCTP Overview", available online at <https://web.archive.org/web/20210417213501/https://www.juniper.net/documentation/us/en/software/junos/gtp-sctp/topics/topic-map/security-gprs-sctp.html>, Jan. 26, 2021, 11 pages.

Robin Seggelmann, "SCTP: strategies to secure end-to-end communication", Doctoral Dissertation, University of Duisburg-Essen, 2012, 143 pages.

Wikipedia, "Multipath TCP", available online at <https://en.wikipedia.org/w/index.php? title=Multipath_TCP&oldid=1039533254>, Aug. 19, 2021, 8 pages.

Wikipedia, "Stream Control Transmission Protocol", available online at << https://en.wikipedia.org/w/index.php? title=Stream_Control_Transmission_Protocol&oldid=1031934097>, Jul. 4, 2021, 9 pages.

* cited by examiner

VIRTUAL SOCKET FOR LOAD BALANCING AND FAILOVER

BACKGROUND

This disclosure is generally related to network load balancing and fault tolerance.

BRIEF DESCRIPTION OF THE FIGURES

In the figures, like reference numerals refer to the same figure elements.

DETAILED DESCRIPTION

Figure 1:
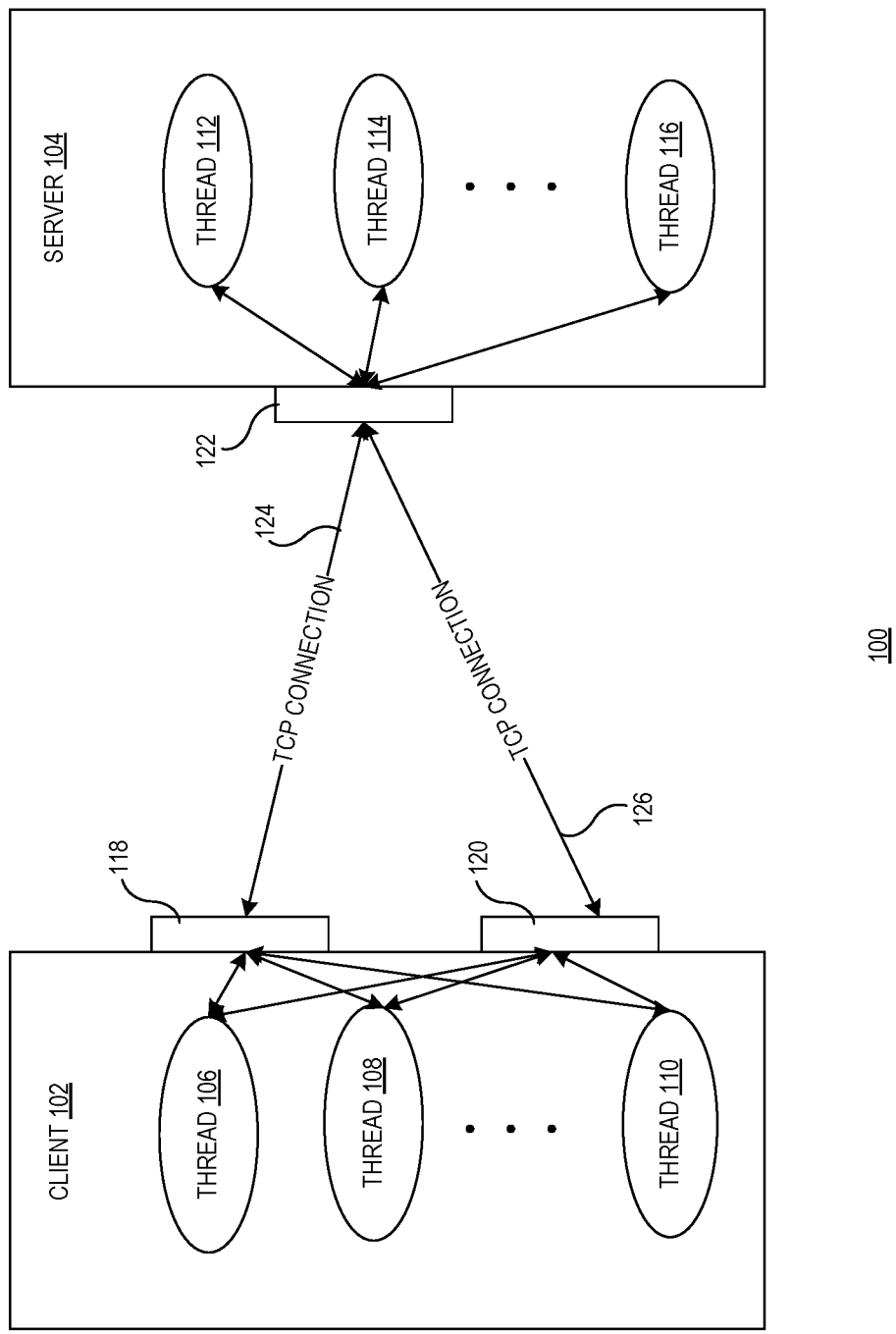
FIG. 1 illustrates an exemplary networked system comprising a client and a server, according to one aspect of the application.

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

In client/server networks (e.g., storage network systems) where clients and servers are interconnected using transport-layer sockets (e.g., Transmission Control Protocol (TCP) sockets), load balancing and link failover are critical to the performance and reliability of the systems. Unbalanced load may cause congestions in the network and failed links may cause traffic loss. It is desirable to provide a load-balancing and failover mechanism that can fully utilize available resources in the system to maximize TCP throughput and make the connections fault tolerant.

Certain client devices (e.g., a client in a storage network having one or more storage nodes) may include multiple network interfaces (e.g., a client device may be equipped with multiple network interface cards (NICs)), and one or more TCP sockets can be established via each network interface. To achieve high throughput and high availability, it is desirable to distribute traffic load among multiple TCP sockets and allow for failover in the event of an interface failure. However, conventional load-balancing solutions often attempt to balance the load among multiple servers without addressing the need to balance the load among TCP sockets. A highly congested network socket may delay the forwarding of the packets from a client to the server, or vice versa. Similarly, conventional failover solutions for link failures do not provide for failover among TCP sockets. For example, a failed TCP socket/interface may cause packet loss. Currently, there is no solution for load balancing and failover among multiple TCP sockets. Moreover, because multiple threads can be executed concurrently on a client or server, the load-balancing/failover solution needs to be thread-safe.

To facilitate load balancing and failover among TCP sockets, according to some aspects of the instant application, a virtual socket can be constructed by encapsulating multiple TCP sockets. The virtual socket can be viewed by applications running on the client or server as one socket with a single write interface and a single read interface for transmitting and receiving packets, respectively. The virtual socket can include multiple incoming and outgoing queues for queuing packets incoming to and outgoing from the virtual socket, respectively. On the client or server side, each encapsulated TCP socket can be communicatively coupled to a single socket-specific incoming queue and multiple thread-specific outgoing queues. Both incoming and outgoing queues are thread safe to ensure that packets in the queues can be accessed by multiple threads in a correct order. Load balancing among the encapsulated TCP sockets can be achieved by forwarding a packet arriving at the write interface of the virtual socket to a particular incoming queue based on load of the TCP sockets. Additionally, a failed TCP socket can be removed from the virtual socket without affecting the outgoing traffic. Further, when the failed TCP socket recovers from the failure, it can be added back to the virtual socket. The virtual socket can be transparent to applications running on the client and server, and no additional burden is added to the application developers to develop applications that can benefit from high throughput provided by the virtual socket.

FIG. 1 illustrates an exemplary networked system comprising a client and a server, according to one aspect. Networked system 100 can include a client 102 and a server 104. Client 102 can execute multiple client threads (e.g., threads 106, 108, and 110); and server 104 can execute multiple server threads (e.g., threads 112, 114, and 116) corresponding to the client treads. More specifically, for each client thread executing on client 102, there is a specific, corresponding server thread executing on server 104. Client 102 can include multiple network interfaces (e.g., interfaces 118 and 120). Server 104 can include a network interface 122.

When executing client threads 106, 108, and 110, client 102 can communicate with (e.g., read from or write to) corresponding server threads executing on server 104. For example, client thread 106 may communicate with corresponding server thread 112. To facilitate such communication, a TCP connection can be established between client 102 and server 104. For example, TCP connection 124 can be established between network interface 118 of client 102 and network interface 122 of server 104, and TCP connection 126 can be established between network interface 120 and network interface 122. A TCP connection between a client and a server can be established by creating a pair of TCP sockets (each TCP socket being an operating-system-provided connection-oriented software interface that implements the TCP protocol), one on the client side and one on the server side. The TCP connection can specify the endto-end communication channel over which the packets are transported between client 102 to server 104.

As shown in FIG. 1, each of the multiple client threads executing on client 102 can communicate with a corresponding server thread executing on server 104 via one of the TCP connections. For example, client thread 106 can communicate with corresponding server thread 112 via TCP connection 124 or TCP connection 126. At any given time, the different TCP connections may have different load. It may take longer for packets transmitted over a heavily loaded TCP connection to arrive at their destinations. To ensure high throughput, it is desirable to have a mechanism that can forward packets via different TCP connections based on the load of each respective TCP connection. Similarly, when hardware failure occurs on one of the network interfaces, the corresponding TCP connection may become unavailable, and it is then desirable to forward packets via other available TCP connection. For example, network interface 118 on client 102 may experience a hardware failure, rendering TCP connection 124 unavailable. In such a situation, all packets from client 102 can be forwarded via TCP connection 126 to prevent packet loss. Note that FIG. 1 is a high-level conceptual drawing showing only the transport-layer (i.e., TCP) communications. Although not shown in FIG. 1, each TCP connection can include a pair of TCP sockets, one client socket on client 102 and one server socket on server 104.

According to some aspects of the present disclosure, a virtual socket pair can be established to include the multiple TCP socket pairs between the client and server to achieve load balancing and failover among these multiple TCP socket pairs. More specifically, to ensure thread safety (i.e., to avoid data-race situations in which different threads are accessing shared data at the same time), thread-safe queues can be used to queue the incoming and outgoing packets. Because the sockets always exist in pairs and each socket pair defines a unique connection between the client and the server, in this disclosure, a socket pair (either a virtual socket pair or a conventional TCP socket pair) can sometimes be referred to as a socket or a connection.

Figure 2:
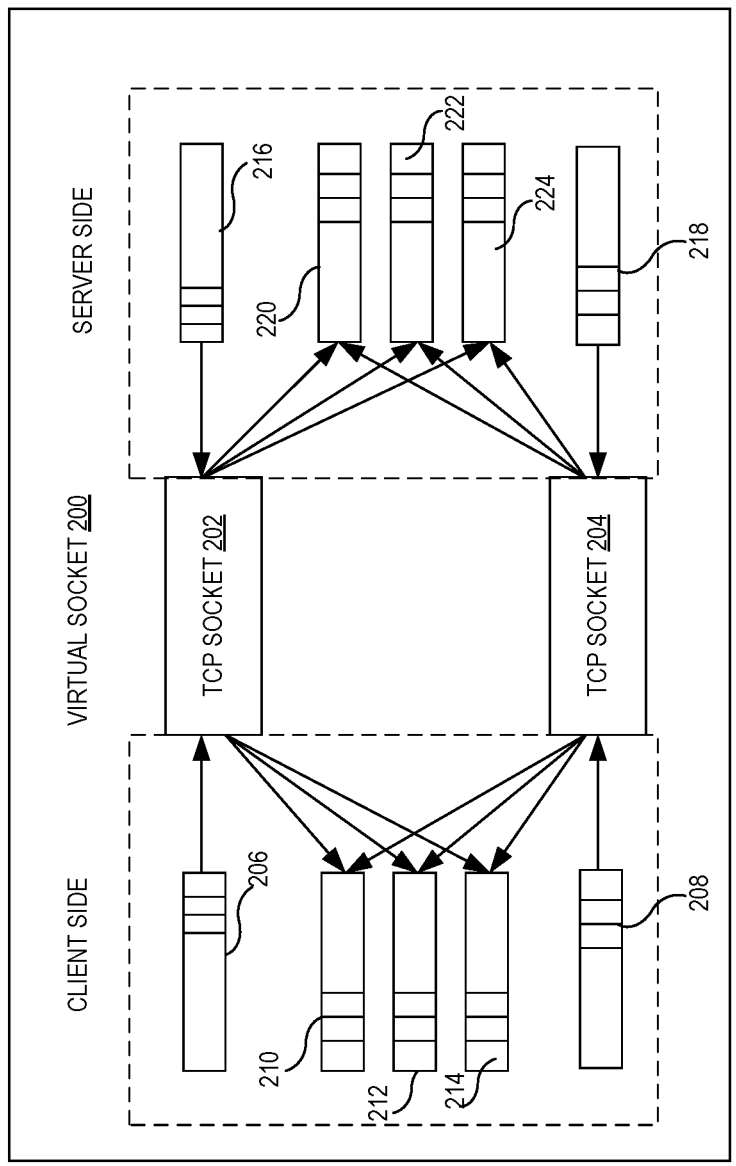
FIG. 2 illustrates an exemplary architecture of a virtual socket, according to one aspect of the application.

FIG. 2 illustrates an exemplary architecture of a virtual socket, according to one aspect. Virtual socket 200 can be constructed by grouping multiple transport-layer sockets (e.g., TCP sockets 202 and 204) and provisioning multiple queues for these TCP sockets. Note that each TCP socket shown in FIG. 2 represents a pair of TCP sockets corresponding to a TCP connection between the client and the server (similar to TCP connection 124 or 126 shown in FIG. 1). Consequently, virtual socket 200 can correspond to multiple TCP connections between the client and the server. These queues can be used to multiplex network connections and packets. More specifically, on each of the client and server sides, each TCP socket can be communicatively coupled to one incoming queue (which queues packets going into the TCP socket) and multiple outgoing queues (which queue packets coming out of the TCP socket). The terms "incoming queues" and "outgoing queues" are defined with respect to the TCP sockets. The incoming queues can be socket-specific, meaning that each incoming queue is dedicated to a particular TCP socket, whereas the outgoing queues can be shared among multiple TCP sockets. To ensure thread safety, all incoming and outgoing queues are thread-safe, meaning that these queues can be accessed by multiple threads in a safe manner (e.g., data for each thread are dequeued in order), and thread synchronization can be maintained.

In the example shown in FIG. 2, on the client side, TCP socket 202 can be coupled to an incoming queue 206, and TCP socket 204 can be coupled to an incoming queue 208. This way, if a packet is to be transmitted over a particular TCP socket or connection, the packet will be queued in an incoming queue corresponding to that particular TCP socket. FIG. 2 also shows that, on the client side, each outgoing queues (e.g., outgoing queues 210, 212, and 214) can be coupled to both sockets 202 and 204. Similarly, on the server side, TCP socket 202 can be coupled to an incoming queue 216, TCP socket 204 can be coupled to an incoming queue 218, and sockets 202 and 204 can each be coupled to a number of outgoing queues (e.g., outgoing queues 220, 222, and 224). According to some aspects, the outgoing queues can be thread specific, meaning that packets originated from a particular thread executed on the client or server will be queued in an outgoing queue dedicated to a corresponding destination thread. Each outgoing queue can be shared by all TCP sockets in the virtual socket. In FIG. 2, it is assumed that there are three threads executing on each of the client and the server. Hence, there are three outgoing queues on each of the client side and the server side. Note that, although shown as one entity, each TCP socket shown in FIG. 2 is essentially a pair of sockets, one socket established on the client side and one socket established on the server side. From the perspective of the client, the socket on the client side can be referred to as a local socket, and the socket on the server side can be referred to as a remote socket. Similarly, from the perspective of the server, the server-side socket is the local socket, and the client-side socket is the remote socket.

As seen in FIG. 2, virtual socket 200 provides multiple paths between the client and server. Each path can include a TCP socket, an incoming queue for multiplexing packets from different threads, and an outgoing queue for multiplexing packets from different paths. For example, FIG. 2 illustrates that, in each direction, a given packet flow can take one of the two incoming queues and one of the three outgoing queues, resulting in six possible paths. The number of incoming queues depend on the number of TCP sockets included in the virtual socket, and the number of outgoing queues depend on the number of threads executing on the client and the server. There can be more incoming queues than outgoing queues, and vice versa. An exemplary client-to-server path can include incoming queue 206, TCP socket 202, and outgoing queue 220; an exemplary server-to-client path can include incoming queue 218, TCP socket 204, and outgoing queue 214. In the example shown in FIG. 2, it is assumed that there are three threads, and consequently each TCP socket can provide three paths, with each path for packets belonging to a particular thread, and where each path is formed of an incoming queue, a TCP socket, and an outgoing queue.

Load balancing between TCP sockets 202 and 204 can be achieved by spreading the incoming packets over the multiple paths. For example, the client or server may select a TCP socket (hence one of the multiple paths associated with the TCP) for packet transmission based on the load of the socket. The actual path being selected also depends on the originating thread of the incoming packet. According to some aspects, the client or server can select the least loaded socket (e.g., a socket with the fewest number of packets in its incoming queue) for packet transmission. The load for each socket can be determined based on the occupancy rate of the corresponding incoming queue. For example, when the client transmits a packet to the server, the client (e.g., a write-interface logic on the client) may determine, based on the occupancy rate of incoming queues 206 and 208, whether to send the packet to TCP socket 202 or 204. The occupancy rate of a queue can be computed based on the capacity (i.e., the amount of allocated memory space) of the queue and the amount of data currently in the queue. Other load-balancing techniques can also be used (e.g., round-robin or hash-based) to balance the load between TCP sockets 202 and 204. Similarly, when the server transmits a packet to the client, the server may determine, based on the relative occupancy rates of incoming queues 216 and 218, whether to send the packet to TCP socket 202 or 204. Although shown as a single entity, virtual socket 200 in fact represents a pair of virtual sockets, the client-side virtual socket and the server-side virtual socket. Detailed descriptions of the internal logic units used for implementing the client- or server-side virtual socket will be described further with reference to FIG. 4.

Virtual socket 200 can also achieve failover between TCP sockets 202 and 204. When one of the TCP sockets fails (e.g., due to hardware failure on either the client-side network interface or the server-side network interface), it can be removed from virtual socket 200, such that all packets going into virtual socket 200 will be transmitted via the remaining TCP socket. For example, in the event of failure of TCP socket 204, if the client intends to transmit a packet to the server, the packet will be sent to incoming queue 206.

Figure 3A:
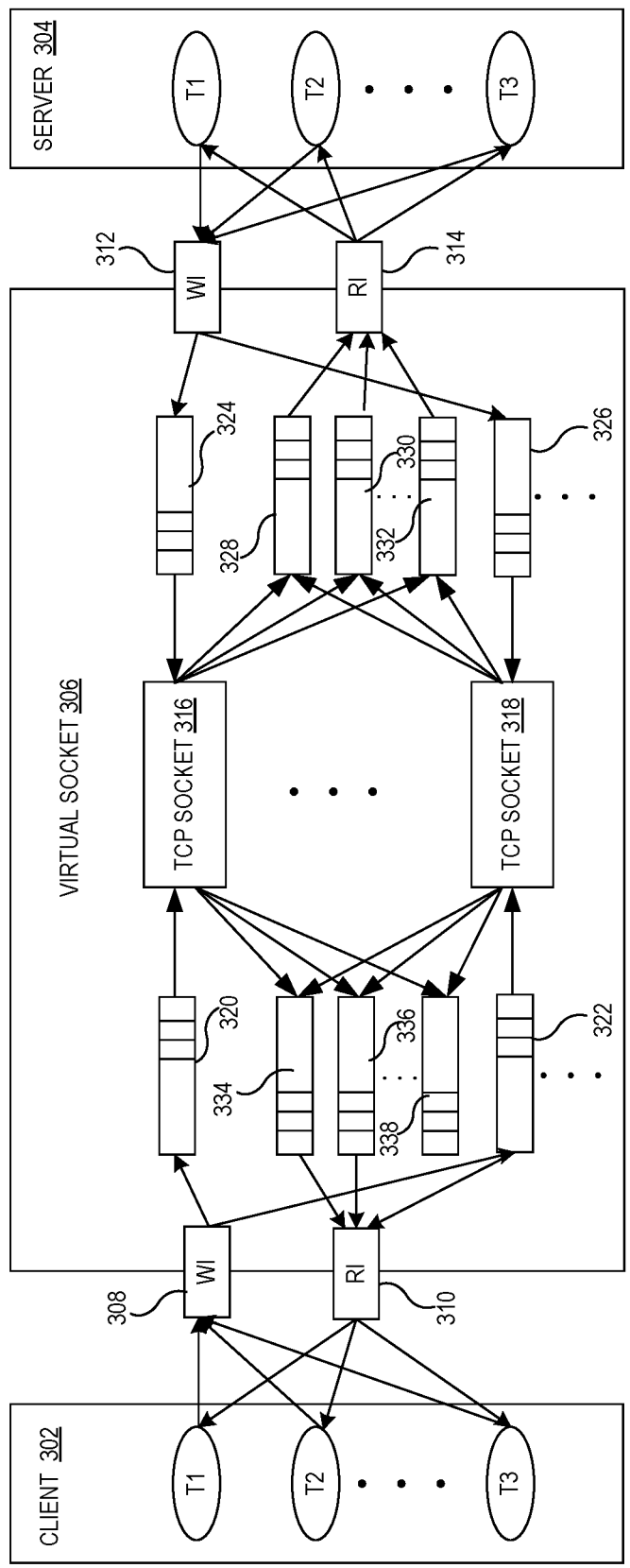
FIG. 3A illustrates an exemplary client/server system implementing a virtual socket, according to one aspect.

When implemented in a client/server system, a virtual socket (or a virtual socket pair) provides an end-to-end communication channel for transporting packets between a client and a server. When multiple threads are running concurrently on the client and the server, the virtual socket can provide an end-to-end communication channel for each thread. FIG. 3A illustrates an exemplary client/server system implementing a virtual socket, according to one aspect. Client/server system 300 can include a client 302 and a server 304. Client 302 can execute multiple client threads (e.g., threads T1, T2, and T3), and server 304 can execute corresponding server threads. A thread on client 302 may communicate with, i.e., send and receive packets to and from, a corresponding thread on server 304. For example, thread T1 on client 302 may send packets to and receive packets from thread T1 on server 304. More specifically, the packets can be exchanged via a virtual socket 306. As explained previously, for simplicity of illustration, virtual socket 306 is shown as a single entity. In practice, virtual socket 306 can be a virtual socket pair that includes a client-side virtual socket residing on client 302 and a server-side virtual socket residing on server 304.

Virtual socket 306 can interface with the client and server via a pair of interfaces on either side (the client side or the server side). The interfaces allow the client or the server to send and receive packets. Threads executing on client 302 or server 304 can only detect the pair of interfaces and, thus, treat virtual socket 306 as a single socket/connection. On the client side, virtual socket 306 can include a write interface (WI) 308 and a read interface (RI) 310. Threads on client 302 can send packets to write interface 308 and receive packets from read interface 310. Similarly, on the server side, virtual socket 306 can include a write interface (WI) 312 and a read interface (RI) 314. Threads on server 304 can send packets to write interface 312 and receive packets from read interface 314.

Virtual socket 306 can encapsulate a number of TCP sockets, such as TCP sockets 316 and 318. Note that encapsulating the TCP sockets means that the TCP sockets become hidden to the client and server and can only be accessed via interfaces (i.e., write and read interfaces) created for the virtual socket. Because virtual socket 306 is shared by multiple threads on client 302, a thread synchronization mechanism can be used to ensure that packets from different threads are not out of order. Conventional approaches rely on thread locks to synchronize the threads, which can be cumbersome and inefficient. To ensure effectiveness and high performance, according to some aspects, a lock-free thread-synchronization scheme can be used. More specifically, instead of using a locking mechanism to enforce thread safety, thread-safe multi-producer-single-consumer queues can be used for packet and/or connection multiplexing. A thread-safe queue allows the multiple threads to access the queue without affecting each other's execution. Various techniques can be used to achieve thread-saft queues, and the scope of this disclosure is not limited to the actual technique used to achieve a thread-safe queue.

According to some aspects, in the packet-incoming direction (the direction where packets enter virtual socket 306), multiple threads can be the producers and a TCP socket can be the single consumer of an incoming queue. For example, at the client side, write interface 308 can forward packets from all threads on client 302 (e.g., threads T1, T2, and T3) to one of the incoming queues (e.g., incoming queue 320 or 322). Each incoming queue can be dedicated to a TCP socket, meaning that packets in that queue will only be sent to the coupled TCP socket. In the example shown in FIG. 3A, incoming queue 320 is dedicated to TCP socket 316, and incoming queue 322 is dedicated to TCP socket 318. A load-balancing logic unit (not shown in FIG. 3A and described further with reference to FIG. 4) can be configured to determine a TCP socket to which to forward the incoming packets based on the load of each individual TCP socket. The load of each TCP socket can be related to the number of packets in the corresponding incoming queue. According to one aspect, an incoming packet should be forwarded to the least loaded TCP socket. To do so, the load-balancing logic unit can determine the number of packets in each incoming queue and select an incoming queue with the least number of packets. Alternatively, the load-balancing logic unit can select an incoming queue in a round-robin fashion or based on a hash function.

In addition, a failover logic unit (not shown in FIG. 3A and described further with reference to FIG. 4) can be configured to facilitate failover among the TCP sockets. In response to determining a hardware failure on one of the network interfaces, the failover logic unit can disable a corresponding TCP socket (or remove the TCP socket from virtual socket 306). This way, write interface 308 may no longer forward incoming packets to the incoming queue corresponding to the disabled TCP socket. When the TCP socket is disabled, so will the corresponding incoming queue be disabled, and existing packets in the disabled incoming queue can be forwarded to incoming queues of other active TCP sockets. After the network interface recovers from the failure, a new TCP socket and corresponding incoming queue can be established and added to virtual socket 306. The incoming queues at the server side (e.g., queues 324 and 326) may behave similarly. Write interface 312 can forward packets from all threads on server 304 (e.g., threads T1, T2, and T3) to one of the server-side incoming queues. A load-balancing logic unit on the server side of virtual socket 306 can balance the load among the TCP sockets by selecting a server-side incoming queue, and a failover logic on the server side of virtual socket 306 handles failover in response to an interface failure on server 304.

According to some aspects, in the packet-outgoing direction (the direction where packets leave virtual socket 306), multiple sockets can be the producers and a thread can be the single consumer of an outgoing queue. For example, at the server side, each TCP socket can send an outgoing packet to one of the outgoing queues (e.g., outgoing queues 328, 330, and 332) based on the destination thread. Outgoing packets destined to thread T1 can be sent to outgoing queue 322, which can only be accessed by thread T1 on server 304. Similarly, outgoing queue 324 can only be accessed by thread T2, and outgoing queue 326 can only be accessed by thread T3. Once an outgoing packet is queued in a particular outgoing queue, a notification can be sent to the corresponding thread, prompting the corresponding thread to read the outgoing queue to obtain the packet. For example, when a packet arrives at outgoing queue 328, thread T1 on server 304 can receive a notification and subsequently read, via read interface 314, the packet. The operations of the outgoing queues on the client side (e.g., outgoing queues 334, 336, and 338) can be similar, such that packets from server 304 can be queued in those outgoing queues before being read, via read interface 310, by corresponding threads on client 302.

Note that, during failover, although the incoming queue of a corresponding disabled TCP socket may also be disabled, the outgoing queues are not affected, as they continue to receive packets from the remaining active TCP sockets.

In the example shown in FIG. 3A, one transport-layer virtual socket is established between client 302 and server 304. In practice, the number of virtual sockets between a client and a server can be configurable. For example, the multiple network sockets/connections established between the client and server can be grouped into a single virtual socket or multiple virtual sockets, depending on the memory constraints. A larger number of virtual sockets may require the client or server device to have a larger memory in order to support an increased number of queues. Load balancing and failover can be achieved among the multiple TCP sockets within each virtual socket. In addition to connecting standalone client and server devices, the virtual socket can also be used to connect a client cluster and a server cluster. More particularly, one or more virtual sockets can be established between the client and server cluster. Moreover, in the example shown in FIG. 3A, each network socket is assigned one incoming queue in each direction. In practice, each incoming queue may include multiple priority sub-queues to enable priority-based load balancing.

Figure 3B:
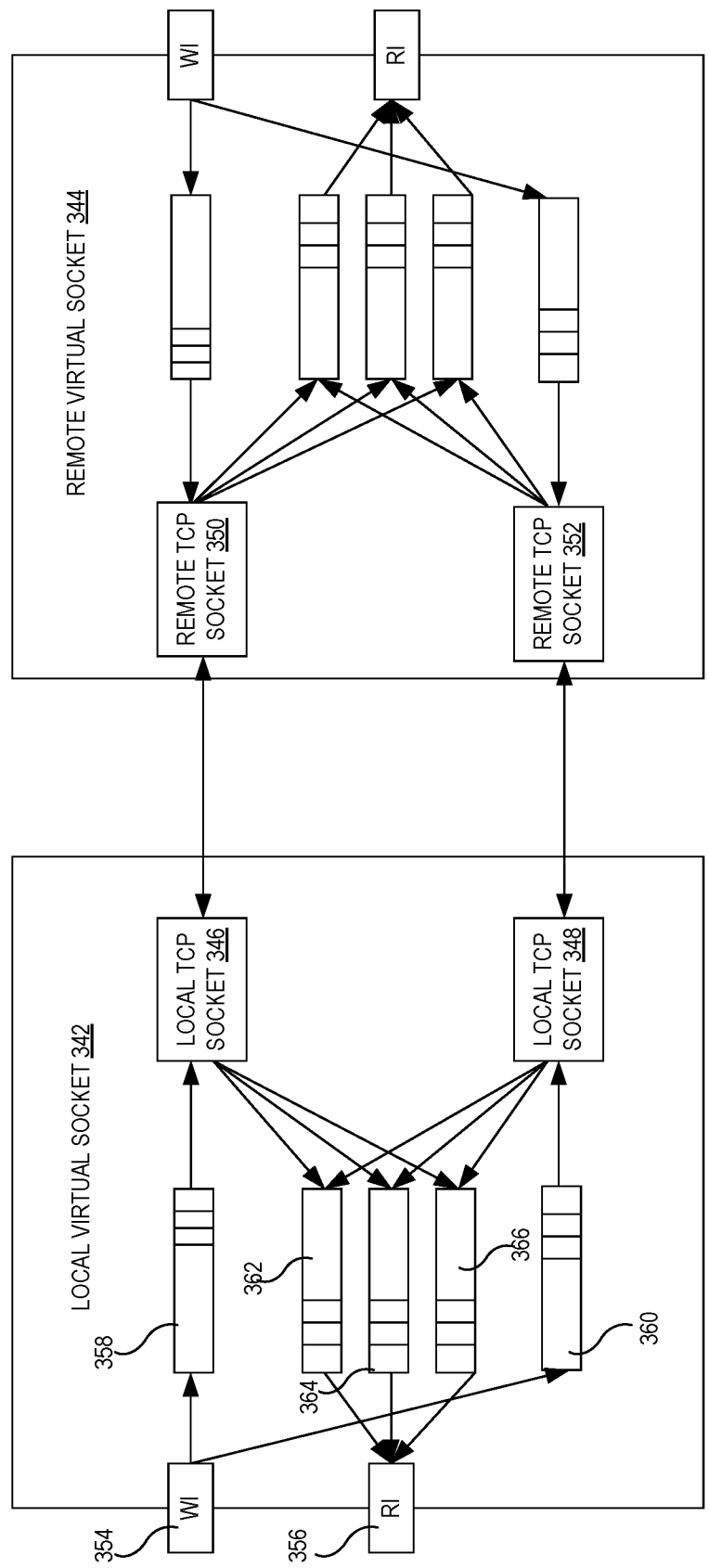
FIG. 3B illustrates an exemplary virtual socket pair, according to one aspect.

As discussed previously, virtual socket 306 shown in FIG. 3A represents a pair of virtual sockets, one residing on the client device and one residing on the server. Depending on the perspective, each socket can be viewed as either a local socket or a remote socket. FIG. 3B illustrates an exemplary virtual socket pair, according to one aspect. Virtual socket pair 340 can include a local virtual socket 342 and a remote virtual socket 344. Local virtual socket 342 can be established by encapsulating local TCP sockets 346 and 348, and remote virtual socket 344 can be established by encapsulating corresponding remote TCP sockets 350 and 352. Each virtual socket can include a write interface for receiving packets from threads running on the corresponding network node (which can be the client or server) and a read interface for sending packets to these threads. For example, local virtual socket 342 can include a write interface 354 and a read interface 356. Packets received via the write interface can be queued at socket-specific incoming queues, and packets to be sent via the read interface can be queued at thread-specific outgoing queues.

At local virtual socket 342, load balancing can be achieved by write interface 354 selecting a queue-specific incoming queue (e.g., incoming queue 358 or 360) to queue an incoming packet. More specifically, the incoming queue can be selected based on the load of the corresponding local TCP socket. If a particular local TCP socket (e.g., local TCP socket 346 or 348) has a lighter load than other local TCP sockets, the incoming queue servicing the particular TCP socket will be selected for queueing the incoming packet. The packet can then be sent to the remote node via the local TCP socket corresponding to the selected incoming queue. At the remote node, the packet can be received via a corresponding remote TCP socket. Similarly, the local node can receive a packet from the remote node via one of the local TCP sockets. Depending on the destination thread of the received packet, the received packet can be sent to one of the outgoing queues 362, 364, and 366. The destination thread can then read the packet from the outgoing queue via read interface 356.

Figure 4:
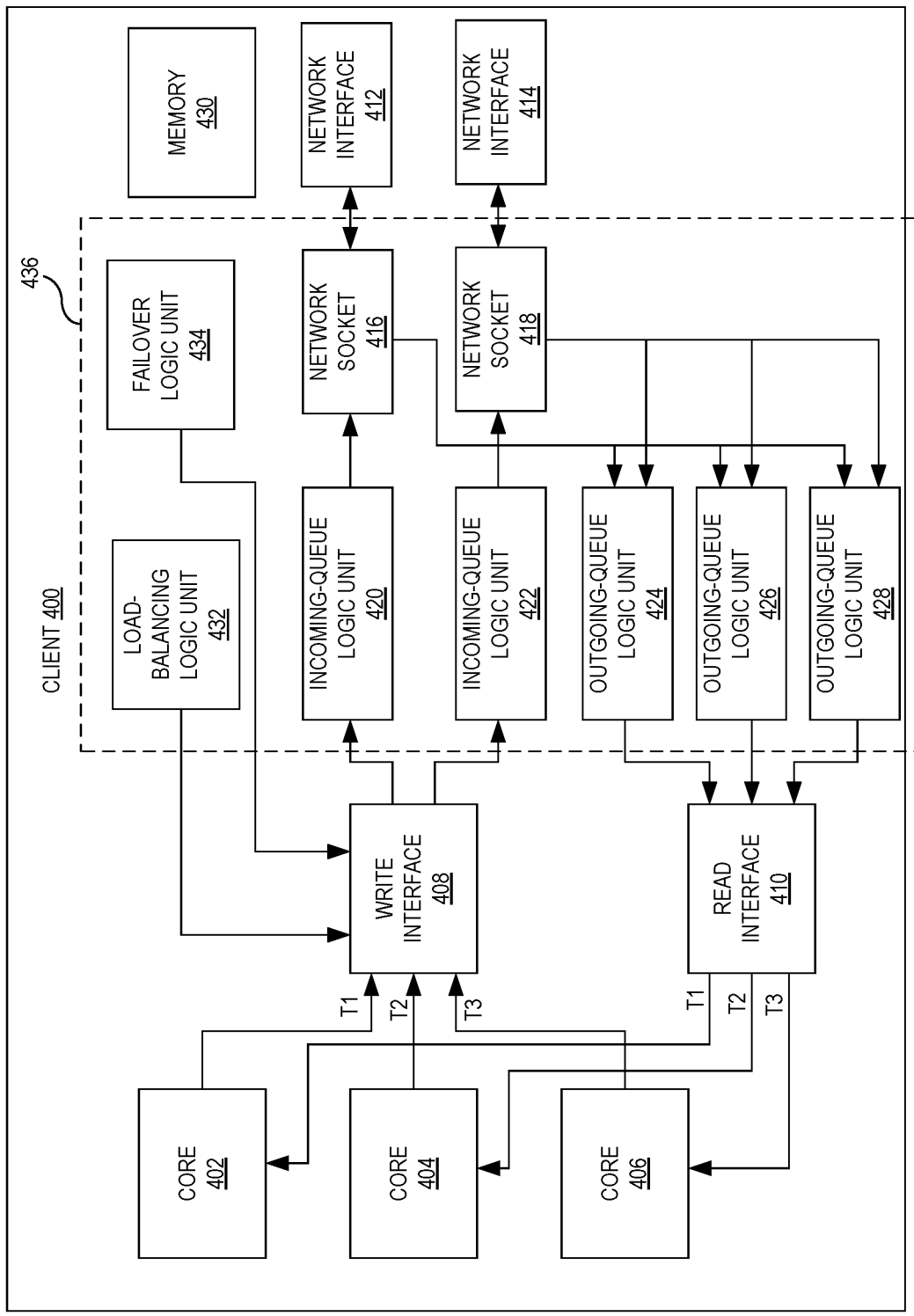
FIG. 4 illustrates an exemplary block diagram of a client device facilitating virtual-socket-based load balancing and failover, according to one aspect.

FIG. 4 illustrates an exemplary block diagram of a client device facilitating virtual-socket-based load balancing and failover, according to one aspect. Client device 400 can include a plurality of processor cores (e.g., cores 402, 404, and 406), each core executing one or more threads. According to one aspect, each core can execute one thread. For example, core 402 can execute a thread T1, core 404 can execute a thread T2, and core 406 can execute a thread T3. Other arrangements can also be possible. For example, not all cores may be activated, or a single core may execute multiple threads. According to a further aspect, client device 400 can be part of a storage system, and the threads can be data path threads (e.g., threads for transportation of data), which are typically single threads running on each core, one thread per core. Because there is a limited number of cores on each client device, the number of active threads can be configurable and small. For example, a client device may include up to eight cores, and the number of cores (hence, the number of threads) that can be activated can be user configurable.

Client device 400 can include a write interface 408 and a read interface 410. Each interface can be an application programming interface (API) that allows client device 400 to exchange data with other devices or computer programs. For example, write interface 408 can allow client device 400 to send packets to other devices (e.g., a server) or programs, and read interface 410 can allow client device 400 to receive packets from other devices or programs. For example, a thread executing on one of the cores on client device 400 can send packets to a corresponding thread executing on the server device by sending (or writing) the packets to write interface 408. Similarly, a thread executing on one of the cores on client device 400 can receive packets from a corresponding thread executing on the server device by receiving (or reading) the packets from read interface 410. Write interface 408 and read interface 410 can both be thread-safe, meaning that multiple threads can access these interfaces without the risk of thread conflict.

Client device 400 can include a number of network interfaces, such as interfaces 412 and 414. Each network interface can be associated with an Internet protocol (IP) address. In one example, each network interface can include a network interface card (NIC). Client device 400 can send and receive packets via the network interfaces. When sending and receiving packets, client device 400 can create one transport-layer network socket (e.g., a TCP socket) for each network interface. In the example shown in FIG. 4, network socket 416 corresponds to network interface 412, and network socket 418 corresponds to network interface 414. Note that the network interfaces are physical interfaces over which packets are transmitted and received, and the network sockets define logic interfaces or endpoints for processes executing on client device 400 to send and receive packets to and from remote processes.

Client device 400 can include a number of logic units for maintaining queues, such as logic units 420-428. Before a packet is sent via a network socket, the packet can be queued in an incoming queue; and before a packet is received by a process executing on one of the cores, the packet can be queued in an outgoing queue. The terms "incoming" and "outgoing" are chosen with respect to the network sockets. As disclosed previously, each incoming queue is dedicated to a network socket, whereas the outgoing queues are shared by all network sockets. For example, incoming-queue logic unit 420 can be responsible for maintaining an incoming queue dedicated to network socket 416, and incoming-queue logic unit 422 can be responsible for maintaining an incoming queue dedicated to network socket 418. Although the outgoing queues are shared by all sockets, each outgoing queue can be dedicated to a particular thread. In other words, a thread can only receive (or read) packets from a corresponding outgoing queue. In the example shown in FIG. 4, outgoing-queue logic units 424, 426, and 428 can be responsible for maintaining outgoing queues dedicated to threads T1, T2, and T4, respectively. Client device 400 can include a memory 440 that can provide physical resources to be allocated to the various incoming and outgoing queues.

Client device 400 can include a load-balancing logic unit 432 configured to enforce a load-balancing policy to balance the load between network sockets 416 and 418. According to one aspect, load-balancing logic unit 432 can be configured to detect the load on each network socket and select a socket with the least load to forward a packet from a thread executing on one of the cores. For example, load-balancing logic unit 432 can determine the occupancy rate of each incoming queue and select an incoming queue with the least occupancy rate. The occupancy rate of a queue can be determined by dividing the amount of data occupying the queue to the total amount of memory allocated for that queue. Alternatively, load-balancing logic unit 432 can determine the number of packets queued in each incoming queue and select an incoming queue with the smallest number of queued packets. Load-balancing logic unit 432 can then send a control signal to write interface 408, directing write interface 408 to forward the packet to the selected incoming queue. The queued packet can subsequently be transmitted to the server device via the corresponding network socket. Other load-balancing policies are also possible. For example, an incoming packet may be sent to the different sockets/incoming queues in a round-robin fashion or by calculating a hash function (e.g., based on the packet header).

Client device 400 can also include a failover logic unit 434 configured to facilitate failover between network sockets 416 and 418. According to one aspect, failover logic unit 434 can be configured to detect a hardware failure on a network interface, and in response to detecting a failed network interface, failover logic unit 434 can be configured to disable the corresponding network socket. For example, in response to detecting a failure on a network interface, failover logic unit 434 can send a signal to write interface 408, instructing write interface 408 to redirect packets to stop forwarding packets to the incoming queue corresponding to the disabled socket. In the example shown in FIG. 4, if failover logic unit 434 detects a hardware failure on network interface 412, failover logic unit 434 can disable network socket 416 by sending a control signal to write interface 408, instructing write interface 408 to redirect incoming packets originally to be forwarded to disabled network socket 416 to remaining network socket 418. More specifically, packets originally to be sent to incoming queue 420 are now redirected to incoming queue 422. Moreover, packets currently queued in incoming queue 420 can be redistributed to incoming queue 422. Once the failed network interface recovers from the hardware failure, failover logic unit 434 can reinstate the failed network socket by sending a control signal to write interface 408.

The network sockets, the various incoming and outgoing queues, load-balancing logic unit 432, and failover logic unit 434 can together form a client-side virtual socket 436. The internal structures (i.e., the queues and network sockets) and controls (e.g., load-balancing and failover controls) of virtual socket 436 are transparent to processes or applications executing on the various cores of client device 400. More specifically, the processes or applications only see a single socket (i.e., virtual socket 346) for sending and receiving packets. Write interface 408 and read interface 410 are the incoming and outgoing interfaces, respectively, of client-side virtual socket 436. The processes or applications can send and receive packets via write interface 408 and read interface 410, respectively.

A server can have a similar architecture as client 400, except that a server can allow multiple network sockets to be established for one network interface. In the client/server system, a network socket established on the client device can have a corresponding network socket established on the server, forming a network socket pair. Similarly, client-side virtual socket 436 and a corresponding server-side virtual socket can form a virtual socket pair. The server-side virtual socket can have a number of logic units similar to those on the client side, including network sockets similar to network sockets 416 and 418, incoming-queue logic units similar to incoming-queue logic units 420-422, outgoing-queue logic units similar to outgoing-queue logic units 424-428, a load-balancing logic unit similar to load-balancing logic unit 432, and a failover logic unit similar to failover logic unit 434.

Figure 5:
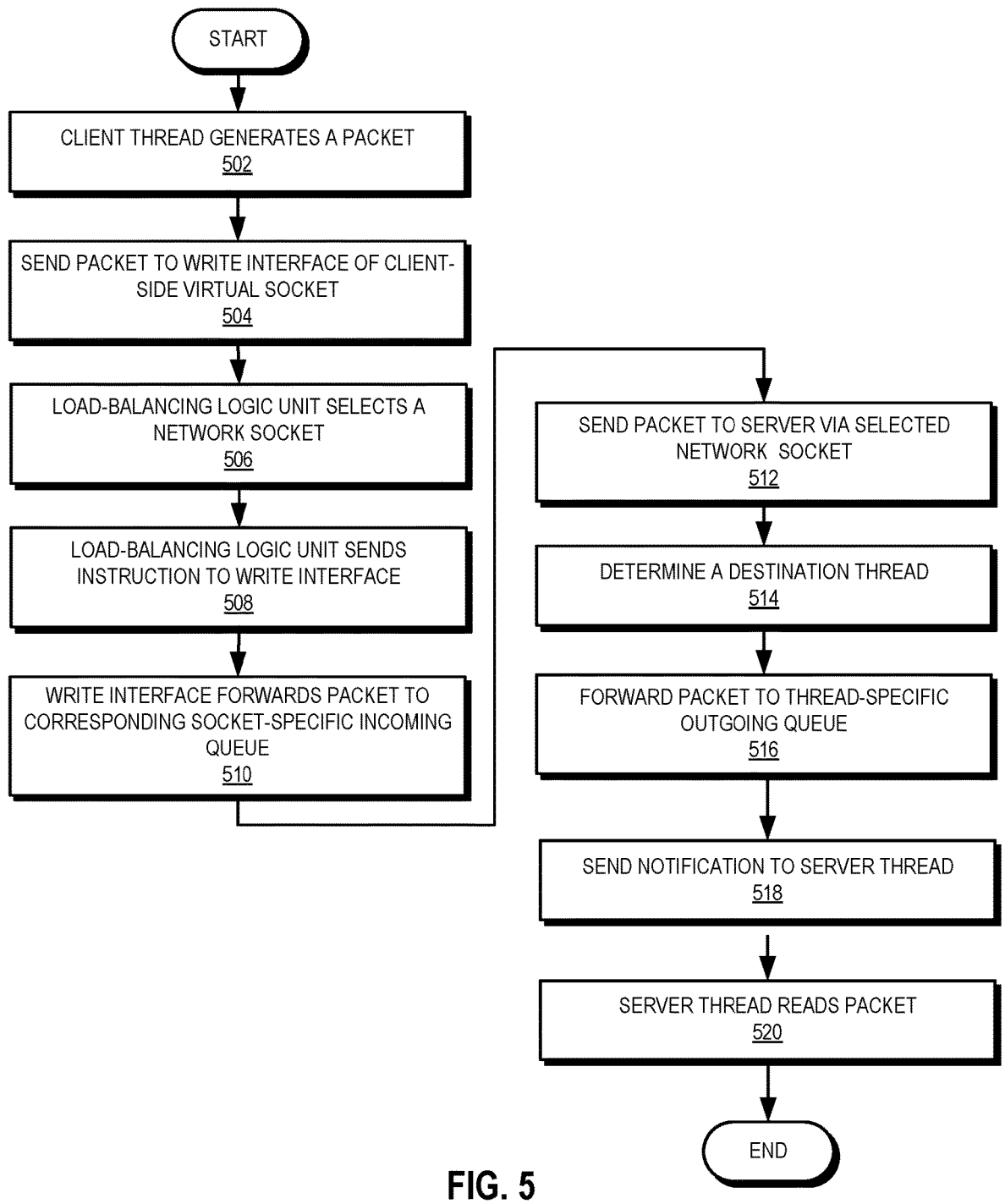
FIG. 5 presents a flowchart illustrating an exemplary packet-exchange process in a client/server system implementing a virtual socket, according to one aspect of the application.

FIG. 5 presents a flowchart illustrating an exemplary packet-exchange process in a client/server system implementing a virtual socket, according to one aspect. This example assumes the packet is transmitted from the client to the server. During operation, a thread executing on the client device can generate a packet to be sent to a corresponding thread executing on the server (operation 502). Note that although the client device may have multiple network interfaces (e.g., NICs), meaning that multiple network sockets may be established to allow the client device to communicate with the server, the thread is only aware of a single connection (i.e., the virtual socket) between the client device and the server. This way, application developers can develop applications that can benefit from the load balancing and failover provided by the virtual socket without the need to modify their programs. The multiple network sockets can be encapsulated within the virtual socket. The virtual socket may include a virtual socket pair comprising a client-side virtual socket and a server-side virtual socket. The client-side virtual socket can include a write interface for sending packets and a read interface for receiving packets.

The generated packet can be sent to the write interface of the client-side virtual socket (operation 504). A load-balancing logic unit (e.g., load-balancing logic unit 432 shown in FIG. 4) can select a network socket encapsulated within the virtual socket for transmission of the packet (operation 506).

According to some aspects, the load-balancing logic unit can select the network socket based on the load of each individual network socket encapsulated within the virtual socket. Each network socket is coupled to a socket-specific incoming queue and can be configured to only receive packets from the socket-specific incoming queue. Determining the load of each individual network socket can involve determining the occupancy rate of each corresponding incoming queue or the number of packets in each queue. The load-balancing logic can select a network socket with the least load. Alternatively, the load-balancing logic can select a network socket using other criteria, such as round-robin or hash-based. The load-balancing logic can send a load-balancing instruction to the write interface, indicating the selected network socket (operation 508). The write interface can then forward the packet to the socket-specific incoming queue corresponding to the network socket (operation 510). Using FIG. 4 as an example, load-balancing logic unit 432 can send the load-balancing instruction to write interface 408, notifying write interface 408 that network socket 416 has been selected based on a predetermined load-balancing policy. Write interface 408 can then forward the incoming packet to incoming-queue logic unit 420, which services network socket 416.

The packet can then be sent to the server via the selected network socket (operation 512). Note that the network socket in fact includes a client-side socket and a server-side socket, and the packet is transmitted by the client-side socket and received at the server-side socket. The physical network interface (e.g., a NIC) bound to the client-side socket is responsible for transmitting the packet to the communication network coupling the client device and the server device. The physical network interface (e.g., a NIC) bound to the server-side socket is responsible for receiving the packet. Various communication protocols can be used for the transport of the packet. According to some aspects, the client device and the server device communicate with each other using TCP, and the network sockets are TCP sockets. Note that the current disclosure is mainly concerned with the end-to-end communication (i.e., the transport layer) between the client and server, and other layers of the network (e.g., the network layer and the physical layer) are beyond the scope of this disclosure.

Once the server-side network socket receives the packet, it determines a destination thread of the packet (operation 514). According to the client/server model, a thread executing on the client device communicates with a corresponding thread executing on the server. Therefore, the server-side network socket can determine the destination thread of the packet based on the identity of the originating thread of the packet. According to some aspects, information regarding the originating thread can be included in the packet header. Based on the identity of the destination thread (e.g., by reading the packet header), the server-side network socket can forward the received packet to a corresponding thread-specific outgoing queue (operation 516). Note that the number of threads executing on the client device and server can be predefined to allow a user to provision resources for the various queues in the virtual socket. In the cases of a storage system, the number of threads typically equals the number of activated processor cores, one thread per activated core. The server-side network socket can also send a notification to the server thread (operation 518). For example, the server-side network socket can read the packet header, determine the destination thread based on the packet header, and send a notification to the destination thread. Upon receiving the notification, the server thread reads, via the read interface of the virtual socket, the packet from the outgoing queue (operation 520).

The operations of the system in the other direction (i.e., transmitting a packet from the server to the client device) can be similar to the ones shown in FIG. 5, except that the various client processes shown in FIG. 5 are occurring on the server, and vice versa. For example, a thread on the server can generate and send a packet to the server-side write interface of the virtual socket, and the server-side loan-balancing logic can select a network-socket encapsulated in the virtual socket for transmission of the packet. The server-side write interface can forward the packet to a corresponding socket-specific incoming queue. The selected server-side socket can subsequently dequeue the packet and send the packet to the corresponding client-side socket, which can then determine the destination thread and queue the packet in the corresponding thread-specific outgoing queue. The server-side socket can also notify the server-side thread about the packet, and the server-side thread can subsequently read, via the server-side read interface of the virtual socket, the packet from the outgoing queue.

Figure 6:
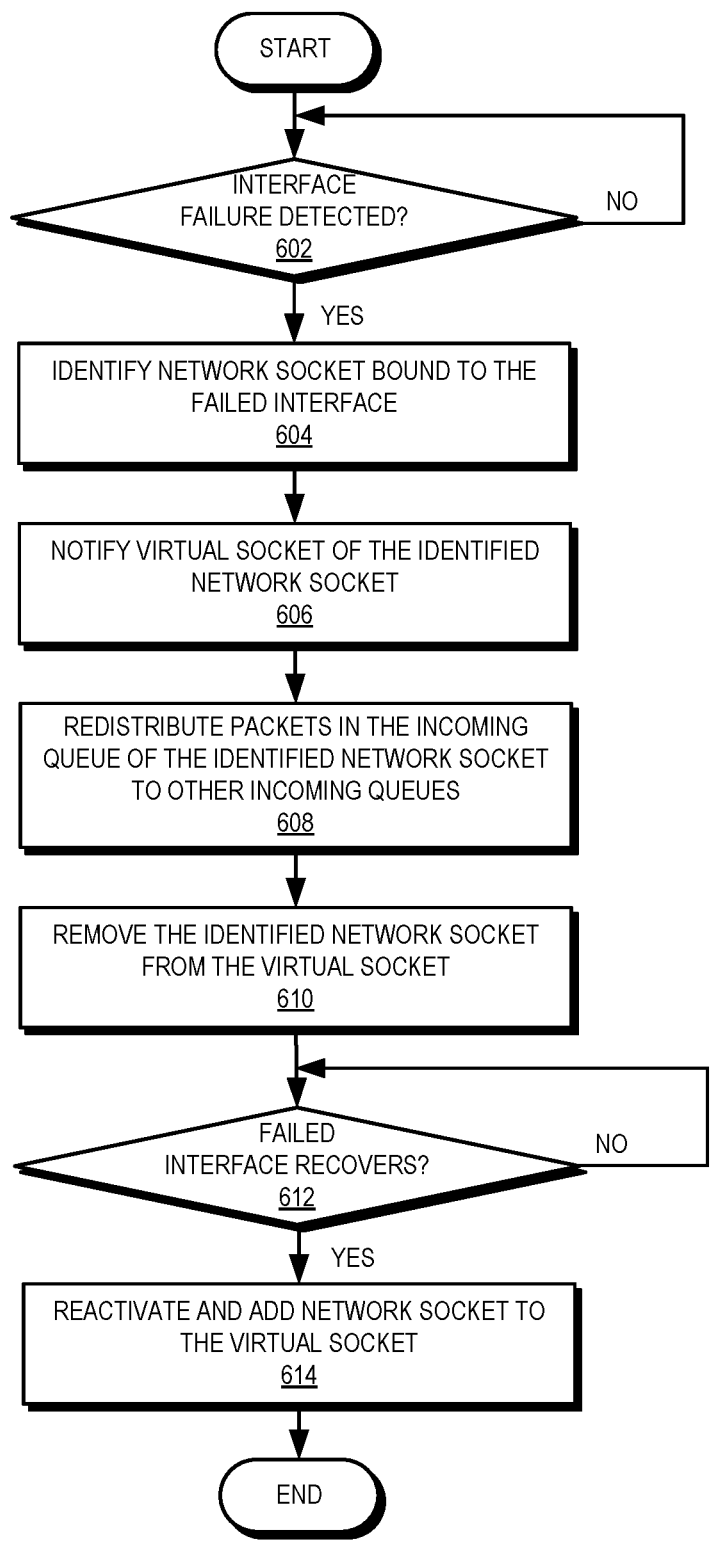
FIG. 6 presents a flowchart illustrating an exemplary failover operation in a client/server system implementing a virtual socket, according to one aspect of the application.

FIG. 6 presents a flowchart illustrating an exemplary failover operation in a client/server system implementing a virtual socket, according to one aspect. This example assumes a failure detected on the client device. During operation, a failover logic unit (e.g., failover logic unit 434 shown in FIG. 4) residing on the client device monitors the various network interfaces to determine whether a network interface experiences hardware failure (operation 602). If failure is detected on a network interface, the failover logic unit can identify a network socket bound to the failed interface (operation 604). The network socket is encapsulated within a virtual socket (e.g., virtual socket 436 shown in FIG. 4). The failover logic unit can notify the virtual socket that the identified network socket is bound to a failed interface (operation 606). In response to the notification, the virtual socket can redistribute packets currently queued in the incoming queue of the identified socket to other incoming queues (operation 608). According to some aspects, those packets can be redistributed by the load-balancing logic unit to other incoming queues. For example, they can be distributed based on the load of the other incoming queues or in a round-robin fashion. The identified network socket can then be removed from the virtual socket (operation 610). Consequently, packets sent to the write interface of the virtual socket will not be sent to the identified network socket. Using FIG. 4 as an example, failover logic unit 434 can determine that network interface 412 fails and notifies virtual socket 436. In response, virtual socket 436 can redirect packets queued in incoming-queue logic unit 420 to incoming-queue logic 422. Virtual socket 436 can remove/deactivate network socket 416 along with incoming-queue logic 420, such that write interface 408 can forward all future incoming packets to incoming-queue logic unit 422, which services network socket 418.

The failover logic unit may monitor the network interfaces and determine whether the failed network interface comes back online (operation 612). If so, the network socket bound to the recovered interface can be reactivated and added to the virtual socket (operation 614). Adding the reactivated network socket back to the virtual socket can include provisioning memory for the incoming queue of the reactivated network socket. Alternatively, if the previously failed socket has been deleted (e.g., no reference to the recovered network interface remains), a new network socket can be created to be bound to the recovered interface.

As can be seen from FIG. 4 and FIG. 5, threads executing on both the client device and the server are only aware of the virtual socket as a single communication endpoint. They are not aware of the multiple network sockets encapsulated within the virtual socket. More specifically, the load-balancing and failover operations occurring within the virtual socket are transparent to those threads. This arrangement can improve the communication throughput of the client/server system and make the connections fault tolerant by ensuring continued communication in the event of a hardware failure.

Figure 7:
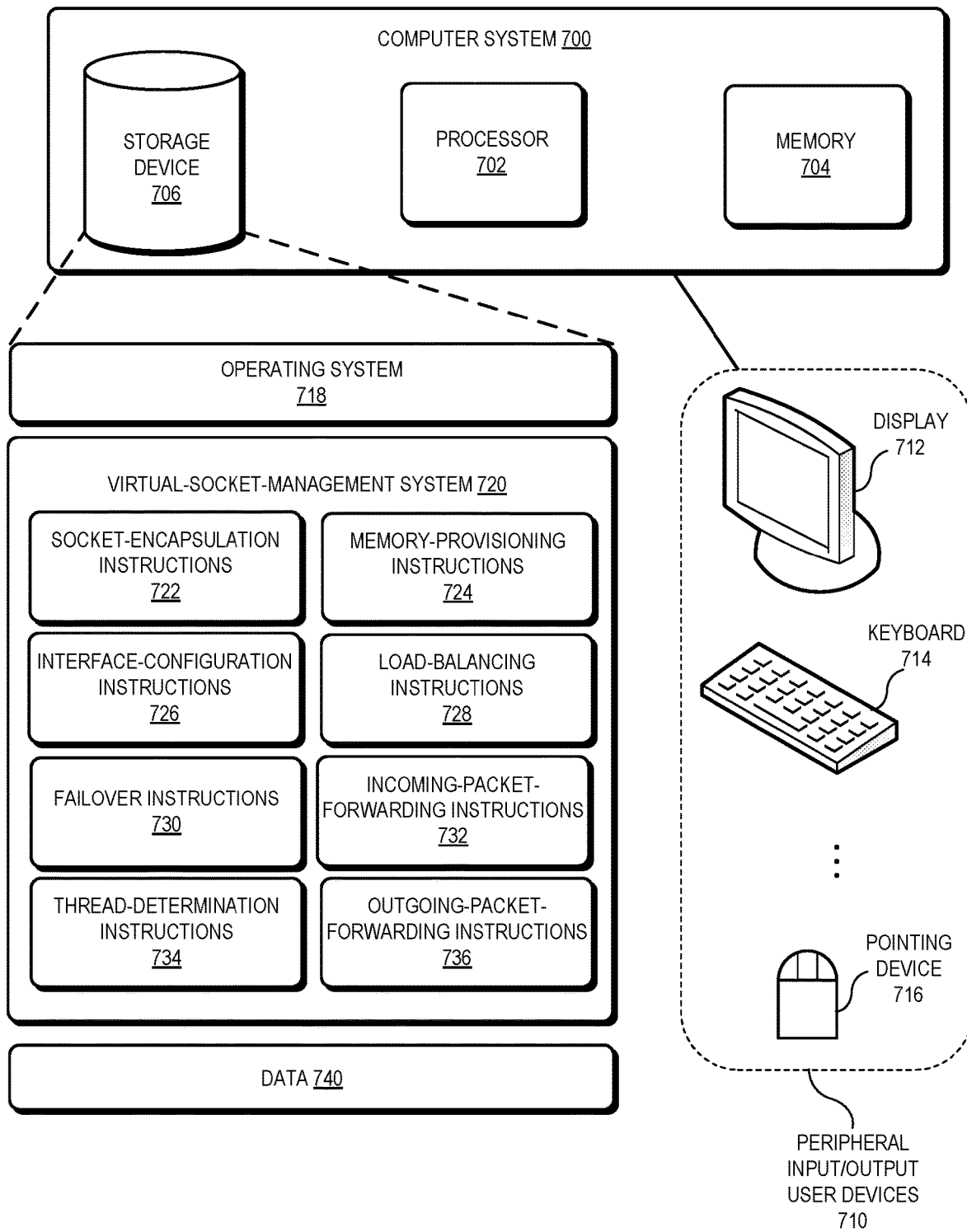
FIG. 7 illustrates an exemplary computer system that facilitates a virtual socket in a client/server system, according to one aspect of the application.

FIG. 7 illustrates an exemplary computer system that facilitates a virtual socket in a client/server system, according to one aspect of the application. Computer system 700 includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 718, a virtual-socket-management system 720, and data 740.

Virtual-socket-management system 720 can include instructions, which when executed by computer system 700, can cause computer system 700 or processor 702 to perform methods and/or processes described in this disclosure. Specifically, virtual-socket-management system 720 can include instructions for encapsulating network sockets to create a virtual socket (e.g., virtual socket 306 shown in FIG. 3A) (socket-encapsulation instructions 722), instructions for provisioning memory for the incoming and outgoing queues (e.g., incoming queues 320-326 and outgoing queues 328-338 shown in FIG. 3A) within the virtual socket (memory-provisioning instructions 724), instructions for configuring the write and read interfaces (e.g., write interface 308 and 312 shown in FIG. 3A and read interfaces 310 and 314 shown in FIG. 3A) of the virtual socket (interface-configuration instructions 726), instructions for enforcing load-balancing policies (load-balancing instructions 728), instructions for performing failover operations (failover instructions 730), instructions for forwarding an incoming packet to a socket-specific incoming queue based on the load-balancing decision (incoming-packet-forwarding instructions 732), instructions for determining a destination thread of a received packet (thread-determination instructions 734), and instructions for forwarding an outgoing packet to a thread-specific outgoing queue (outgoing-packet-forwarding instructions 736).

In general, the present disclosure provides a solution to enable load balancing and failover among multiple network sockets (e.g., TCP sockets) established between a client and a server. A virtual socket can be created by encapsulating the multiple network sockets. The virtual socket can include a write interface and a read interface to allow the client device or server to send and receive packets, respectively. Thread-safe multi-producer single-consumer queues can enable lock-free synchronization among multiple threads executing on the client device and server. When an incoming packet is received at the virtual socket, the virtual socket's load-balancing logic can select a network socket based on a predetermined load-balancing policy and forward the incoming packet to a corresponding socket-specific incoming queue. For an outgoing packet, the virtual socket can determine its destination thread and forward the outgoing packet to a corresponding thread-specific outgoing queue. This approach allows packets to be exchanged between the client and server in a thread-safe manner while enabling load balancing and interface failover. The load balancing and failover operations are transparent to processes executing on the client device and server. In addition to storage systems, this approach can be applied to any scale of client/server system, as long as the number of threads on both the client and server can be predefined.

One aspect of the instant application can provide a system and method for balancing load among multiple network sockets established between a local node and a remote node. During operation, the system can encapsulate, at the local node, the multiple network sockets to form a local transport-layer virtual socket comprising a write interface and a read interface. The system can receive, at the write interface of the local transport-layer virtual socket, a packet; select, based on a load-balancing policy, a network socket from the multiple network sockets; and forward the packet to a socket-specific incoming queue associated with the selected network socket to allow the packet to be sent to the read interface of a corresponding remote transport-layer virtual socket via the selected network socket.

In a variation on this aspect, selecting the network socket can include determining a load of each network socket and selecting a network socket with least load.

In a further variation, determining the load of each network socket can include one of: determining an occupancy rate of the socket-specific incoming queue associated with each network socket, and determining a number of packets queued in the socket-specific incoming queue associated with each network socket.

In a further variation, the selected network socket with the least load can correspond to a socket-specific incoming queue with a lowest occupancy rate or a smallest number of queued packets In a variation on this aspect, in response to detecting that a network interface associated with a particular network socket fails, the system can remove the network socket from the local transport-layer virtual socket and redistribute packets queued in the socket-specific incoming queue associated with the particular network socket to other socket-specific incoming queues associated with other network sockets encapsulated within the local transport-layer virtual socket.

In a further variation, in response to detecting a recovery of the failed network interface, the system can create a new network socket bound to the recovered network interface and encapsulate the new network socket to the local transport-layer virtual socket.

In a variation on this aspect, the local and remote nodes can each execute multiple threads. The system can further receive, from the remote node, a packet associated with a particular thread executing on the remote node, determine a destination thread executing on the local node associated with the packet received from the remote node, and forward the packet received from the remote node to a thread-specific outgoing queue based on the destination thread.

In a further variation, the system can further notify the destination thread to allow the destination thread to read the packet received from the remote node from the thread-specific outgoing queue via the read interface.

In a further variation, the thread-specific outgoing queue can be thread safe and is accessible to the multiple network sockets.

In a further variation, the socket-specific incoming queue can be thread safe and is accessible to the multiple threads.

One aspect of the instant application can provide an apparatus for balancing load among multiple network sockets established between a local node and a remote node. The apparatus can include a local transport-layer virtual socket encapsulating the multiple network sockets. The local transport-layer virtual socket can include a write interface, a read interface, and multiple socket-specific incoming queues to store packets received via the write interface. The apparatus can also include a load-balancing logic unit to select, based on a load-balancing policy, a network socket from the multiple network sockets for transmission of a packet received via the write interface. The write interface of the local transport-layer virtual socket is to forward the packet to a socket-specific incoming queue associated with the selected network socket to allow the packet to be sent to the read interface of a corresponding remote transport-layer virtual socket via the selected network socket.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A computer-implemented method for balancing load among network sockets established between a local node and a remote node, the method comprising:
    presenting, to the local node, a single write interface and a single read interface using a virtual socket, wherein:
        the single write interface is configured to transmit packets to the remote node, and
        the single read interface is configured to receive the packets from the remote node;
    encapsulating, using the virtual socket, a set of Transmission Control Protocol (TCP) sockets between the local node and the remote node, wherein:
        the virtual socket comprises a set of socket-specific incoming queues and a set of thread-specific outgoing queues,
        each socket-specific incoming queue is coupled to a corresponding encapsulated TCP socket and is to queue packets to be transmitted over the corresponding encapsulated TCP socket, and
        each thread-specific outgoing queue is coupled to the set of encapsulated TCP sockets and is to queue packets to be received by a corresponding thread executing on the local node;
    restricting access to the encapsulated set of TCP sockets to access via the single write interface and the single read interface;
    receiving, at the single write interface, a packet sent by the local node; and
    applying a load-balancing technique to select an encapsulated TCP socket from the encapsulated set of TCP sockets; and
    forwarding the packet to a socket-specific incoming queue corresponding to the selected encapsulated TCP socket.

2. The method of claim 1, wherein selecting the encapsulated TCP socket comprises:
    determining a load of each encapsulated TCP socket; and
    selecting an encapsulated TCP socket with least load.

3. The method of claim 2, wherein determining the load of each encapsulated TCP socket comprises one of:
    determining an occupancy rate of the socket-specific incoming queue associated with each encapsulated TCP socket; and
    determining a number of packets queued in the socket-specific incoming queue associated with each encapsulated TCP socket.

4. The method of claim 3, wherein the selected encapsulated TCP socket with the least load corresponds to a socket-specific incoming queue with a lowest occupancy rate or a smallest number of queued packets.

5. The method of claim 1, further comprising:
    in response to detecting that a network interface associated with a particular encapsulated TCP socket fails, removing the particular encapsulated TCP socket from the virtual socket; and
    redistributing packets queued in the socket-specific incoming queue associated with the removed particular TCP socket to other socket-specific incoming queues associated with other TCP sockets encapsulated within the virtual socket.

6. The method of claim 5, further comprising:
    in response to detecting a recovery of the failed network interface, creating a new TCP socket bound to the recovered network interface; and
    encapsulating the new TCP socket to the virtual TCP-socket.

7. The method of claim 1, wherein the local and remote node each execute multiple threads, and wherein the method further comprises:
    receiving, from the remote node, a packet associated with a particular thread executing on the remote node;
    determining a destination thread executing on the local node associated with the packet received from the remote node; and
    forwarding the packet received from the remote node to a thread-specific outgoing queue based on the destination thread.

8. The method of claim 7, further comprising notifying the destination thread to allow the destination thread to read the packet received from the remote node from the thread-specific outgoing queue via the read interface.

9. The method of claim 7, wherein the thread-specific outgoing queue is thread safe and is accessible to the encapsulated set of TCP sockets.

10. The method of claim 7, wherein the socket-specific incoming queue is thread safe and is accessible to the multiple threads.

11. The computer-implemented method of claim 1, further comprising:
    providing to the local node, at the single read interface, a second packet sent by the remote node via an encapsulated TCP socket from the encapsulated set of TCP sockets.

12. The computer-implemented method of claim 1, further comprising:
    forwarding the packets received from all threads on a client device to one of the set of socket-specific incoming queues.

13. An apparatus for balancing load among network sockets established between a local node and a remote node, the apparatus comprising:
a local transport-layer virtual socket that is to:
present, to the local node, a single write interface and a single read interface, wherein:
the single write interface is configured to transmit packets to the remote node,
the single read interface is configured to receive packets from the remote node;
encapsulate a set of TCP sockets between the local node and the remote node, wherein:
the local transport-layer virtual socket comprises a set of socket-specific incoming queues and a set of thread-specific outgoing queues,
each socket-specific incoming queue is coupled to a corresponding encapsulated TCP socket and is to queue packets to be transmitted over a corresponding encapsulated TCP socket, and
each thread-specific outgoing queue is coupled to the set of encapsulated TCP sockets and is to queue packets to be received by a corresponding thread executing on the local node; and
restricts access to the encapsulated set of TCP sockets to access via the single write interface and the single read interface; and
a non-transitory computer-readable medium storing instructions, which when executed by one or more processing resources, cause the one or more processing resources to apply a load-balancing technique to select an encapsulated TCP socket from the encapsulated set of TCP sockets and forward the packet to a socket-specific incoming queue corresponding to the selected encapsulated TCP socket.

14. The apparatus of claim 13, wherein, selecting the encapsulated TCP socket comprises:
determining a load of each encapsulated TCP socket; and
selecting an encapsulated TCP socket with least load.

15. The apparatus of claim 14, wherein, the instructions further cause the one or more processing resources to determine the load of each encapsulated TCP socket by:
determining an occupancy rate of the socket-specific incoming queue associated with each encapsulated TCP socket; or
determining a number of packets queued in the socket-specific incoming queue associated with each encapsulated TCP socket.

16. The apparatus of claim 15, wherein the selected encapsulated TCP socket with the least load corresponds to a socket-specific incoming queue with a lowest occupancy rate or a smallest number of queued packets.

17. The apparatus of claim 13, wherein the instructions further cause the one or more processing resources to:
in response to detecting that a network interface associated with a particular encapsulated TCP socket fails, remove the particular encapsulated TCP socket from the local transport-layer virtual socket; and
cause packets queued in the socket-specific incoming queue associated with the removed particular TCP socket to be redistributed to other socket-specific incoming queues associated with other TCP sockets encapsulated within the local transport-layer virtual socket.

18. The apparatus of claim 17, wherein the instructions further cause the one or more processing resources to:
in response to detecting a recovery of the failed network interface, create a new TCP socket bound to the recovered network interface; and
encapsulate the new TCP socket to the local transport-layer virtual socket.

19. The apparatus of claim 13, wherein the selected encapsulated TCP socket:
receives, from the remote node, a packet associated with a particular thread executing on the remote node;
determines a destination thread executing on the local node associated with the packet received from the remote node; and
forwards the packet received from the remote node to a thread-specific outgoing queue based on the destination thread.

20. The apparatus of claim 19, wherein the selected encapsulated TCP socket:
notifies the destination thread to allow the destination thread to read the packet received from the remote node from the thread-specific outgoing queue via the read interface.

21. The apparatus of claim 19, wherein the thread-specific outgoing queue is thread safe and is accessible to the encapsulated set of TCP sockets.

22. The apparatus of claim 19, wherein the socket-specific incoming queue is thread safe and is accessible to multiple threads.

* * * * *